United States Patent
Kwon et al.

(10) Patent No.: US 9,681,139 B2
(45) Date of Patent: Jun. 13, 2017

(54) METHOD AND APPARATUS FOR ROI CODING USING VARIABLE BLOCK SIZE CODING INFORMATION

(71) Applicant: SAMSUNG ELECTRONICS CO., LTD., Suwon-si, Gyeonggi-do (KR)

(72) Inventors: Nyeong-Kyu Kwon, Daejeon (KR); Insu Park, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 437 days.

(21) Appl. No.: 14/197,756

(22) Filed: Mar. 5, 2014

(65) Prior Publication Data

US 2014/0254670 A1  Sep. 11, 2014

(30) Foreign Application Priority Data

Mar. 7, 2013  (KR) .................. 10-2013-0024620

(51) Int. Cl.
*H04N 19/124* (2014.01)
*H04N 19/167* (2014.01)
*H04N 19/176* (2014.01)
*H04N 19/119* (2014.01)
(Continued)

(52) U.S. Cl.
CPC ......... *H04N 19/167* (2014.11); *H04N 19/119* (2014.11); *H04N 19/124* (2014.11); *H04N 19/147* (2014.11); *H04N 19/157* (2014.11); *H04N 19/176* (2014.11)

(58) Field of Classification Search
CPC .......... H04N 19/00569; H04N 19/169; H04N 19/17; H04N 19/176
See application file for complete search history.

(56) References Cited

U.S. PATENT DOCUMENTS

| | | | |
|---|---|---|---|
| 6,256,423 B1 | 7/2001 | Krishnamurthy et al. |
| 6,490,319 B1 | 12/2002 | Yang |
| 7,702,513 B2 | 4/2010 | Kishi |

(Continued)

FOREIGN PATENT DOCUMENTS

| | | |
|---|---|---|
| JP | 2004-235935 | 8/2004 |
| JP | 2009512283 | 3/2009 |

(Continued)

*Primary Examiner* — Christopher Findley
(74) *Attorney, Agent, or Firm* — F. Chau & Associates, LLC

(57) ABSTRACT

A video/image compression method based on an region of interest (ROI) can be performed in a variable block video encoder such as a HEVC. A ROI coding method using variable block size coding information partitions a maximum coding unit (LCU) block obtained from an image into coding unit (CU) blocks. To obtain a quantization parameter of each coding unit (CU) block, the value of its quantization parameter is assigned based on its first hierarchical depth information and its second hierarchical depth information by using the first hierarchical depth information related to the size of the coding unit (CU) block and using the second hierarchical depth information related to the size of a prediction unit (PU) block correspondingly represented in consequence of the partition of the coding unit (CU) block. The resulting values of a quantization parameter assigned to different coding unit (CU) blocks may be different.

14 Claims, 12 Drawing Sheets

(51) Int. Cl.
*H04N 19/147* (2014.01)
*H04N 19/157* (2014.01)

(56) References Cited

U.S. PATENT DOCUMENTS

| | | |
|---|---|---|
| 2006/0215766 A1 | 9/2006 | Wang et al. |
| 2007/0076957 A1 | 4/2007 | Wang et al. |
| 2007/0189623 A1 | 8/2007 | Ryu |
| 2010/0034425 A1 | 2/2010 | Lin et al. |
| 2010/0183070 A1 | 7/2010 | Lu et al. |
| 2011/0096826 A1* | 4/2011 | Han .................. H04N 19/52 375/240.01 |
| 2012/0201306 A1 | 8/2012 | Kang et al. |
| 2012/0300850 A1* | 11/2012 | Yie .................. H04N 19/105 375/240.16 |

FOREIGN PATENT DOCUMENTS

| | | |
|---|---|---|
| JP | 2010507327 | 3/2010 |
| KR | 1020060103409 | 9/2006 |
| KR | 1020070074356 | 7/2007 |
| KR | 1020100046435 | 5/2010 |
| KR | 1020100095833 | 9/2010 |
| KR | 1020120059214 | 6/2012 |
| WO | 2007035065 | 3/2007 |

\* cited by examiner

METHOD AND APPARATUS FOR ROI CODING USING VARIABLE BLOCK SIZE CODING INFORMATION

CROSS-REFERENCE TO RELATED APPLICATIONS

This application claims priority under 35 U.S.C. §119 to Korean Patent Application No. 10-2013-0024620 filed on Mar. 7, 2013, the disclosure of which is incorporated by reference in its entirety.

1. Technical Field

The present inventive concept herein relates to encoding fields of a video or image signal, and more particularly, to a method and an apparatus for ROI coding using variable block size coding information.

2. Discussion of the Related Art

As information communication technology including the internet continues to develop, image-based communication as well as character (text) and voice based communications is on the increase. Since a conventional character oriented communication cannot always satisfy the consumer, multimedia services that can accept various types of information such as text, images, music, etc, are increasing. Since the quantity of data in multimedia data is very large, it needs a higher capacity storage medium and a wider bandwidth is needed when transmitting the multimedia data. Thus, compression coding methods are used when transmitting multimedia data including characters, images and audio.

A basic step in a method of compressing data is the process of removing redundancy of data. Data can be compressed by removing a spatial redundancy (such as if the same color or object is repeated in an image) or a time redundancy (such as if an adjacent frame changes little in a video frame or if the same sound is repeated in an audio). Since a visual perception ability of human is insensitive to high frequency changes, data can be compressed by removing even a psychovisual redundancy with this point in view.

Image data in a frame may include a region in which the amount of bits is suddenly increased, such as a region in which a viewer's interest is concentrated and a region in which there are many movements in an image screen. This region is called a region of interest (ROI).

The region of interest (ROI) may have a large effect on the overall quality of video/image while an encoding operation is performed.

SUMMARY

An aspect of the inventive concept provides a region of interest (ROI) coding method using variable block-size coding information. The region of interest coding method using variable block size coding information may include the steps of: partitioning a maximum coding unit (ICU) block obtained from an image into coding unit (CU) blocks; and assigning a value of a quantization parameter to every coding unit (CU) block differently depending on first hierarchical depth information and second hierarchical depth information by determining the quantization parameter using the first hierarchical depth information related to the size of the coding unit (CU) block and the second hierarchical depth information related to the size of a prediction unit (PU) block correspondingly represented in consequence of the partition of the coding unit (CU) block to obtain the quantization parameter of the coding unit (CU) block.

An aspect of the inventive concept provides an encoder for a high efficiency video coding. The encoder for high efficiency video coding may include a rate-distortion comparison part calculating and comparing the rate-distortion cost of a coding unit (CU) block partitioned from a maximum coding unit (LCU) block obtained from an image; and a quantization parameter updating part assigning a value of a quantization parameter to every coding unit (CU) block differently depending on first hierarchical depth information and second hierarchical depth information by determining the quantization parameter using the first hierarchical depth information related to the size of the coding unit (CU) block and the second hierarchical depth information related to the size of a prediction unit (PU) block correspondingly represented in consequence of the partition of the coding unit (CU) block to obtain the quantization parameter of the coding unit (CU) block.

An encoder for performing a high efficiency video coding (HEVC) comprising a plurality of M sub-encoders; a partitioner circuit configured to partition a maximum coding unit (LCU) block obtained from an image frame into a plurality of M coding unit (CU) blocks; a rate-distortion comparison part for calculating and comparing the rate-distortion cost of each coding unit (CU) divided into sub blocks at a hierarchical depth N+1 and the rate-distortion cost of the coding unit (CU) divided into sub blocks at a hierarchical depth N.

The encoder for a high efficiency video coding of claim 16, further comprising a circuit configured, for each coding unit (CU) block, to obtain the quantization parameter of the coding unit (CU) block by assigning a value of its quantization parameter based on first hierarchical depth information and second hierarchical depth information by determining its quantization parameter using the first hierarchical depth information related to the size of the coding unit (CU) block and the second hierarchical depth information related to the size of a prediction unit (PU) block corresponding to the partition of the coding unit (CU) block.

Embodiments of inventive concepts will be described more fully hereinafter with reference to the accompanying drawings, in which embodiments of the invention are shown. In the drawings, the size and relative sizes of regions and circuits may be exaggerated or equalized for clarity. Like numbers refer to like elements throughout. Various embodiments of the inventive concept may be embodied in different forms and should not be constructed as limited to the exemplary embodiments set forth in the figures described below. Rather, these exemplary embodiments are provided so that this disclosure will be thorough and complete, and will fully convey the scope of the inventive concept to those skilled in the art. Like numbers refer to like elements throughout.

BRIEF DESCRIPTION OF THE FIGURES

Preferred embodiments of the inventive concept will be described below in more detail with reference to the accompanying drawings, in which.

DETAILED DESCRIPTION OF EXEMPLARY EMBODIMENTS

Figure 1:
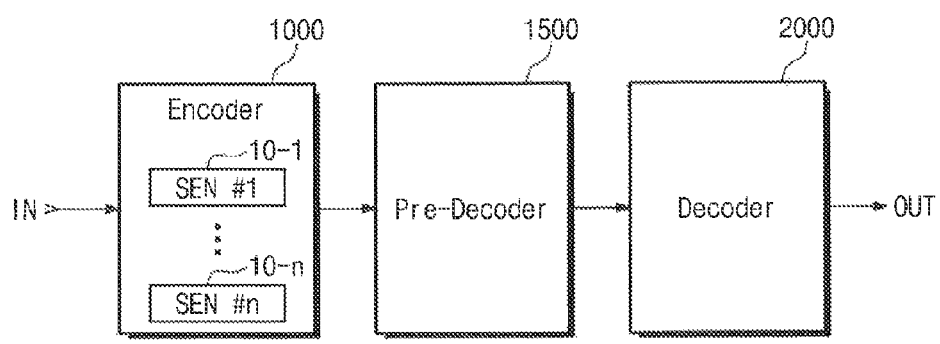
FIG. 1 is a block diagram of an image processing device including an encoder in accordance with a exemplary embodiment of the inventive concept.

FIG. 1 is a block diagram of an image processing device including an encoder 1000 in accordance with a exemplary embodiment of the inventive concept. The image processing device of FIG. 1 includes an encoder 1000, a pre-decoder 1500, and a decoder 2000.

The encoder 1000 of FIG. 1 includes a plurality of sub-encoders 10-1 through 10-n. The encoder 1000 may be used not only in a video sequence and/or an image compression using a high efficiency video coding (HEVC) standard but also in all kinds of video coding operations within a variable block size.

The high efficiency video coding (HEVC) was established as new video coding standard in January 2010 by the ITU-T and ISO/MPEG, ISO/IEC and that are developing the high efficiency video coding (HEVC) standard have organized a Joint Collaborative Team on Video Coding (JCT-VC). One of the aims of the JCT-VC is to improve (by twice as much as the H.264/AVC) the compression ratio. A HEVC test model (HM) was recently confirmed. A large block structure technology among various HM technologies uses three kinds of encoding units subdivided from a macro block concept. These are a coding unit (CU), a transform unit (TU) and a prediction unit (PU). The CU and TU have a recursive syntax structure extending a compression unit and a conversion technology and the PU has the same form as H.264/AVC.

Figure 4:
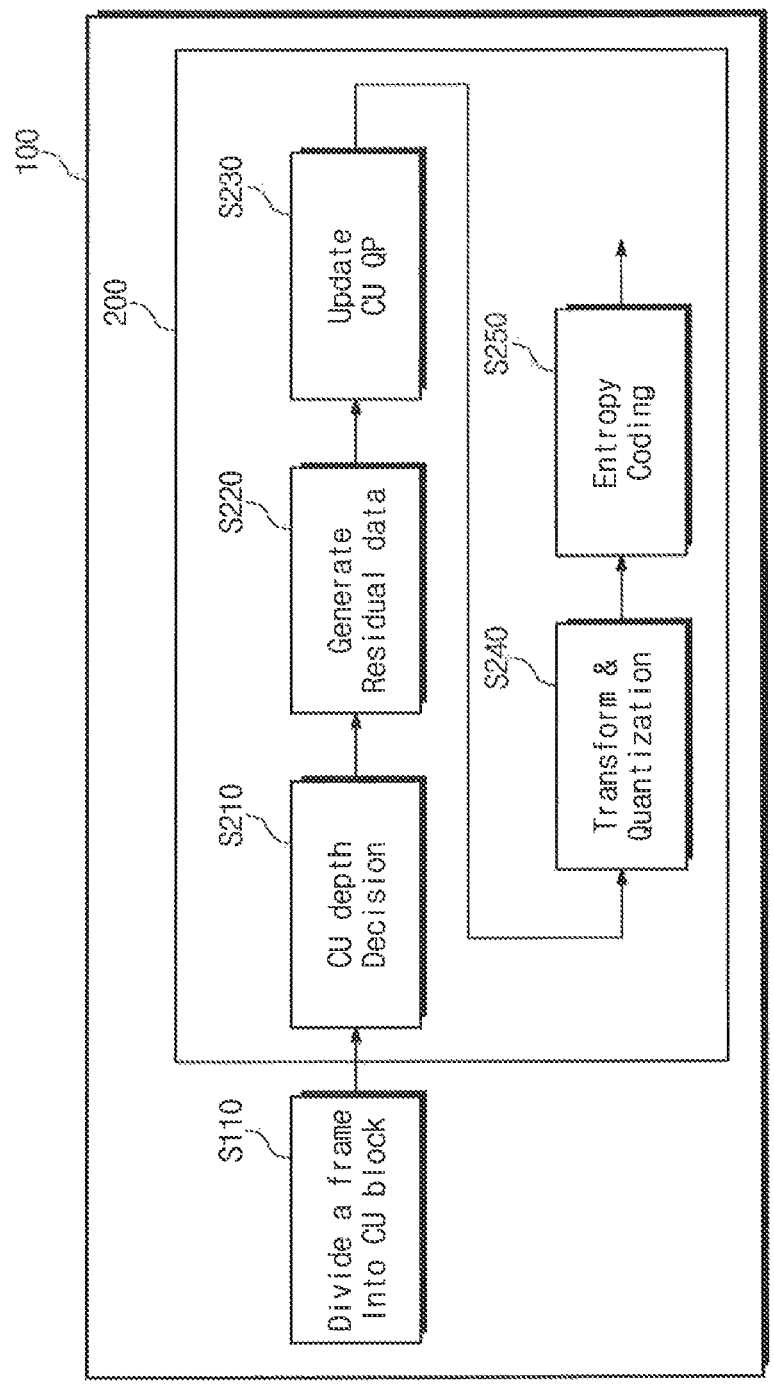
FIG. 4 is a flowchart/block diagram illustrating the whole encoding method performed in the image processing device of FIG. 1, in accordance with an exemplary embodiment of the inventive concept.

The encoder 1000 performs an encoding method such as is illustrated in FIG. 4.

In FIG. 1, the pre-decoder 1500 receives data compressed by the encoder 1000 to perform a pre-decoding operation.

The decoder 2000 that can be provided to the image processing device decodes data pre-decoded by the pre-decoder 1500 to restore original video/image data.

Figure 2:
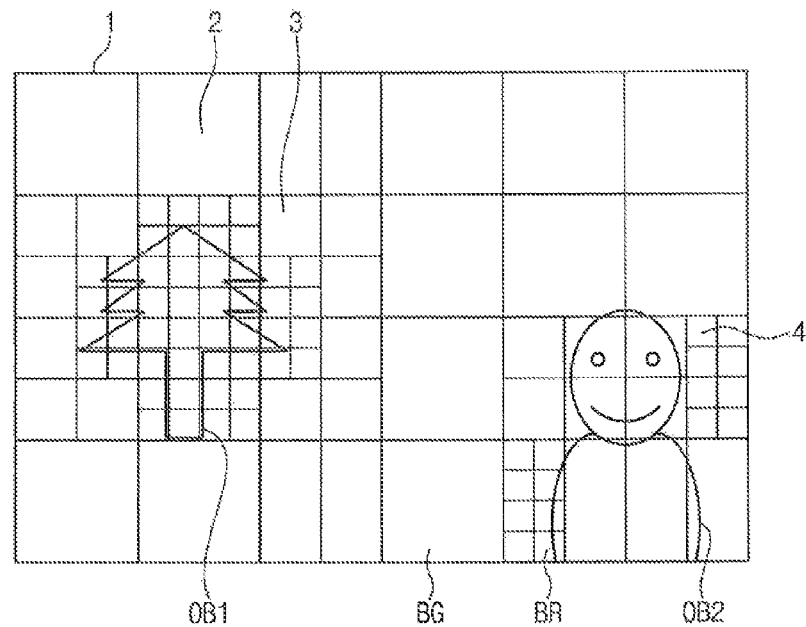
FIG. 2 is a drawing illustrating a video frame/image having two objects.

A video image/frame to be encoded, such as is illustrated in FIG. 2, is applied to the input terminal IN of the encoder 1000.

FIG. 2 is a drawing illustrating a video frame/image having two objects (OB1, OB2).

Referring to FIG. 2, in which one frame having two objects (OB1, OB2) is illustrated, a first region (1) represents the whole one frame/image. Thus, the first region (1) indicates the whole one video frame or whole one image frame.

A second region (2) included in the first region (1) represents a region of the frame 1 sized for performing an encoding operation using the largest coding unit size. The hierarchical depth of a coding unit with respect to the second region (2) may be set to 0. A coding unit (CU) blocks having hierarchical depth information of 0 is called a largest coding units (LCUs). The LCUs may have a slice size of a minimum of 8 pixels×8 pixels up to a maximum of 64 pixels×64 pixels. The LCUs can be recursively partitioned in a code tree form and the resulting partitioned unit is called a coding unit (CU). The CUs can be additionally partitioned by a prediction unit (Pus).

Even in the case of HEVC encoding block structure, a CU is constituted in a quadtree form of 64×64 ~8×8 pixels as a basic unit by which an encoding of CU is made. The most significant CU is called a coding tree unit (CTU). A prediction unit (PU) is a unit used for a prediction on a screen and for a prediction between screens, and each PU includes information of a reference index, a moving vector and a prediction mode in a screen. Each PU may have eight shapes of 2N×2N, 2N×N, N×2N, N×N, nL×2N, Nr×2N, 2N×nU, 2N×nD. A transformation unit (TU) is a unit by which transformation is made and is constituted in a quadtree structure of 32×32~4×4. One CU can be divided into several TV and can be divided independently from a PU.

A third region (3) smaller than the second region (2) represents a region for performing an encoding operation using a medium coding unit size. The hierarchical depth of the coding unit may be set 1.

A fourth region (4) smaller than the third region (3) represents a region for performing an encoding operation using a small coding unit size. The hierarchical depth of the coding unit may be set 2.

The smaller the size of the coding unit (CU) block becomes, the greater the hierarchical depth value (information) of the coding unit. As the number of times that the LCU is partitioned increases, the hierarchical depth value (information) of the resulting coding units becomes greater.

In FIG. 2, a boundary region (BR) exists between the background region (BG) and a region of interest (ROI). The two regions of interest (BR) in FIG. 2 include the two objects (OB1, OB2).

As shown in FIG. 2, the size of coding unit (CU) blocks in one portion of the frame/image (1) may be different from the sizes in another portion of the frame/image (1). A coding unit (CU) block having a smaller size can be applied to encode a more detailed texture region.

Figure 3A:
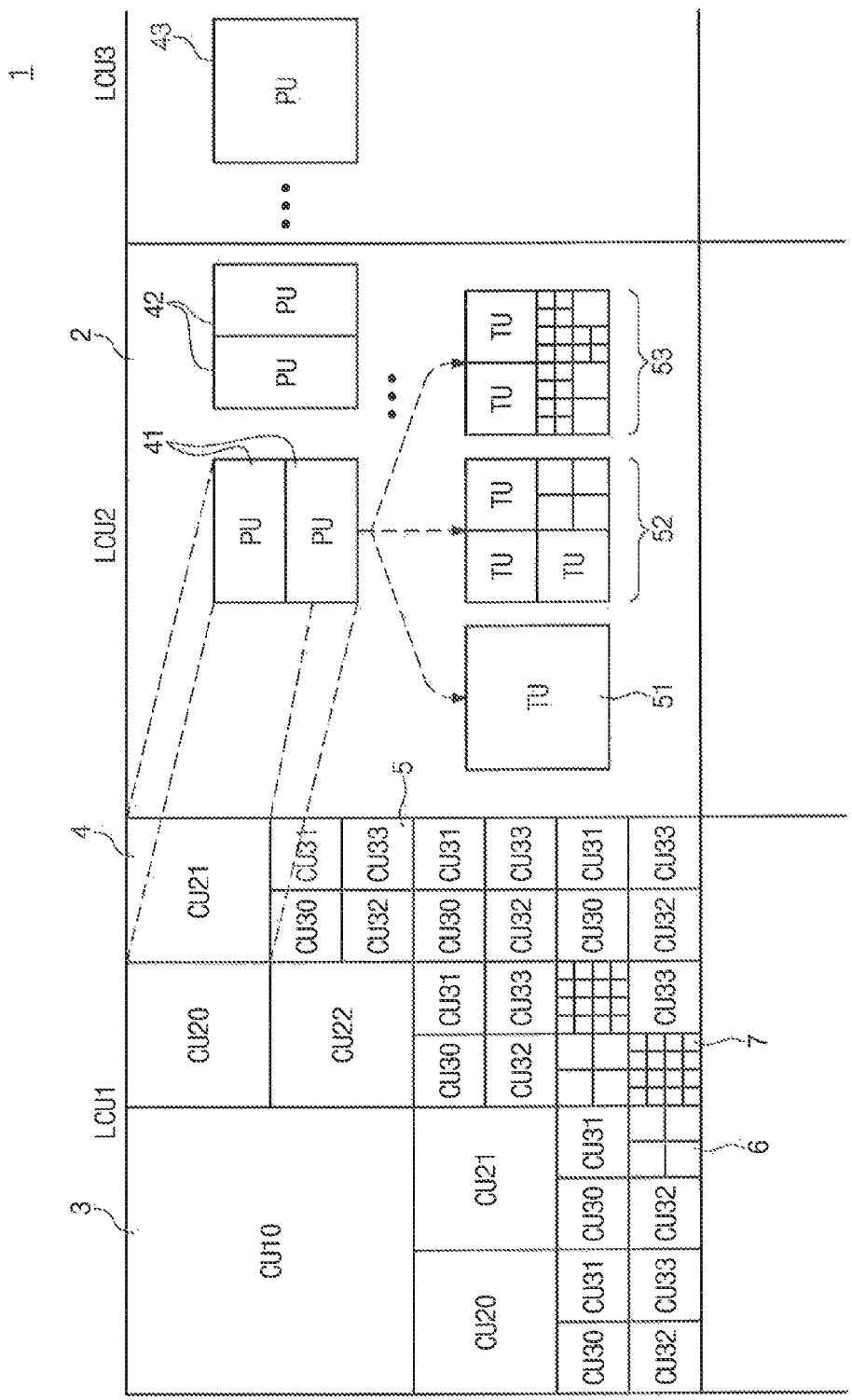
FIG. 3A is an illustrative view of prediction unit (PU) blocks and transform unit blocks being partitioned from a coding unit (CU) block of the video frame/image of FIG. 2.

FIG. 3A is an illustrative view of prediction unit (PU) blocks and transform unit block being partitioned from a coding unit (CU) block of the video frame/image of FIG. 2.

Referring to FIG. 3A, one frame/image (1) is partitioned into a plurality of LCUs(2) and one LCU1(2) can be partitioned into a plurality of CUs(3,4) having different hierarchical depths from one another using a quadtree decomposition. In the case that the hierarchical depth value of CU(Coding Unit:4) is 2 as defined in FIG. 2, the hierarchical depth value of CU(3) may be 1 as defined in FIG. 2. Since in FIG. 3A, the block size of a CU21(4) is partitioned to be one quarter of the block size of a CU10(3), the hierarchical depth value of the CU21(4) is greater than that of the CU10(3) by 1. The hierarchical depth value of the CU21(4) is smaller than that of CU33(5) by 1. Similarly, the hierarchical depth value of a CU(7) is greater than that of a CU(6) by 1.

In FIG. 3A, one CU(4) (e.g., CU21(4)) may be constituted by at least one prediction unit (PU) and at least one transform unit (TU).

The prediction unit (PU) may correspond to a partition of a code unit (CU) for predicting pixel values. For example, one CU21(4) may become two PU(41) such that the CU21(4) is horizontally partitioned into 2 parts. Or, one CU21(4) may become two PU(42) such that the CU21(4) is vertically partitioned into 2 parts. Or one CU21(4) may become two PU(43) having the same size as the CU21(4). Thus, each CU can be partitioned into a PU which is a symmetrical square partition unit of a maximum 2. The hierarchical depth value (information) of a PU may be the same as or different from the hierarchical depth value (information) of a CU depending on the partitioning.

A transform unit (TU) may be used to express basic units being spatially transformed by a discrete cosine transform (DCT) and may have a size equal to the size of the corresponding CU as the maximum size. The CU may be partitioned into one or more TUs on the basis of a quadtree decomposition.

For example, the one CU21(4) may become a TU(51) having the same size as the CU21(4), or may become multiple TU(52)s such that the CU21(4) is partitioned into 4 or 16 parts, or may become a TU(53) such that the CU21(4) is partitioned into 4, 1.6 or 64 parts.

The PU and the TU are subunits of the CU.

The prediction unit (PU) blocks and the transform unit (TU) blocks illustrated in FIG. 3A are only examples. The inventive concept is not limited thereto. For instance, various partition methods may exist and hierarchical depths of the prediction unit (PU) blocks and the transform unit (TU) blocks may be variously set.

Figure 3B:
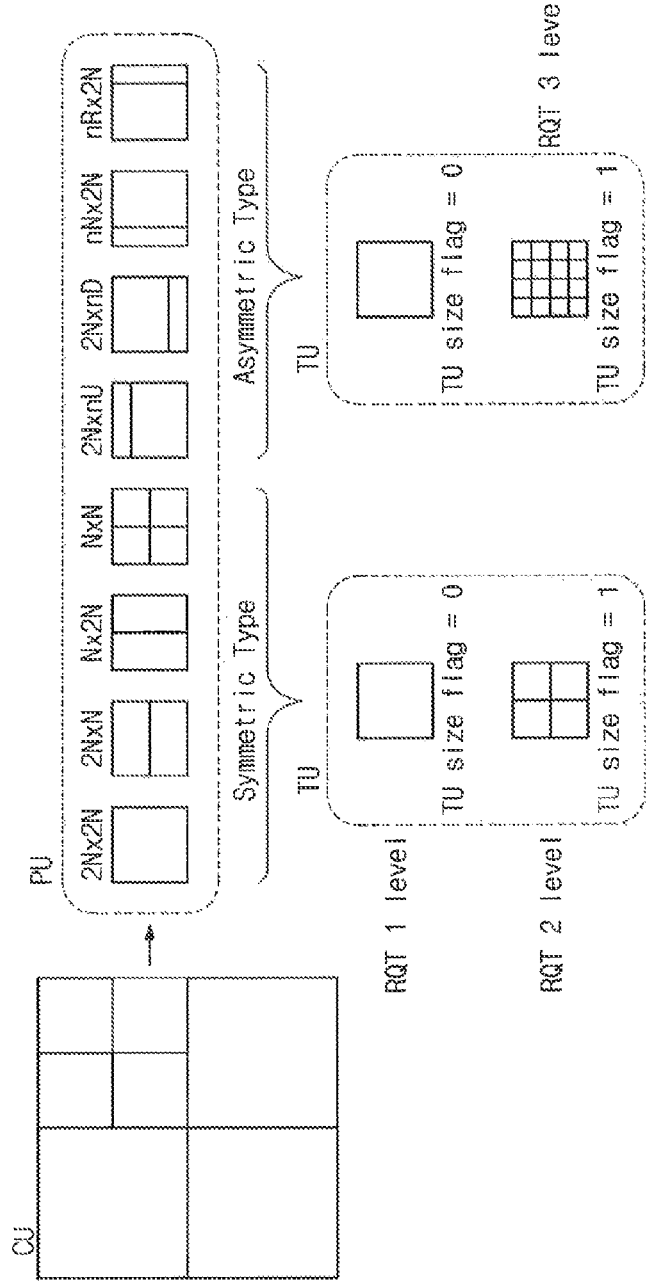
FIG. 3B is an illustrative view illustrating the types of encoding units represented in FIG. 3A.

FIG. 3B is an illustrative view illustrating the types of encoding units represented in FIG. 3A.

Referring to FIG. 3B, a CU may be constituted by various symmetric types of PUs and/or by various asymmetric types of PUs.

A TU having a Residual Quadtree Transform (RQT) 1 level and a TU having an RQT 2 level are illustrated in PUs of the symmetric type. A TU size flag=0 means that the hierarchical depth information value of the TU is 0.

A TU having an RQT 1 level and a TU having an RQT 3 level are illustrated in PUs of the asymmetric type. A TU size flag=1 means that the hierarchical depth information value of the TU is 1.

FIG. 4 is a flowchart/block diagram illustrating the whole encoding method performed in the mage processing device of FIG. 1, in accordance with exemplary embodiments of the inventive concept.

Referring to FIG. 4, a schematic encoding method compressing a video frame/image is illustrated.

In FIG. 4, the block 100 represents an encoding method of an entire one frame.

As illustrated in the step/block 110, one frame can be divided into a plurality of coding unit (CU) blocks. A step/block 200 represents an encoding method at the level of one coding unit (CU) block.

The encoding method 200 at the coding unit (CU) block level is as follows: a hierarchical depth decision of coding unit (CU) block step S210, a generation of residual data after inter or intra prediction step S220, the updating of quantization parameter value with respect to a current coding unit (CU) block step S230, a transform & quantization 240 and an entropy coding step S250 are sequentially performed as sub steps of the encoding coding unit (CU) block level method 200.

Figure 5:
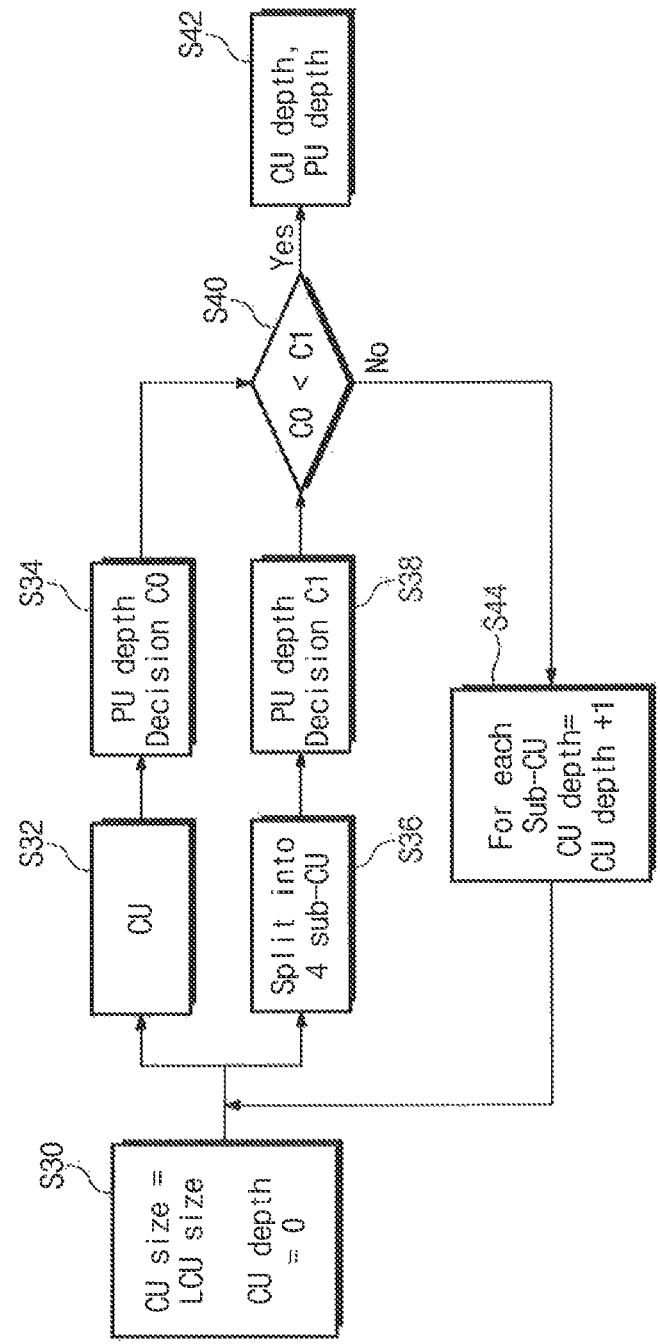
FIG. 5 is a flow chart illustrating a hierarchical depth decision algorithm of a coding unit (CU) block being applied during performance of the method of FIG. 4.

In the exemplary embodiments of the inventive concept, a algorithm such as illustrated in FIG. 5 may be executed for the updating of quantization parameter value with respect to a current coding unit (CU) block step S230.

The obtainment of a quantization parameter value (QP) with respect to a current coding unit (CU) block is executed by considering the rate-distortion cost, first hierarchical depth information related to the size of a coding unit (CU) block as texture information and a second hierarchical depth information related to the size of a prediction unit (PU) block being correspondingly represented according to a partition of the coding unit (CU) block. Accordingly, a quantization parameter value is differently assigned to every block depending on the first hierarchical depth information and the second hierarchical depth information.

If the first hierarchical depth information related to the size of the coding unit (CU) block, and the second hierarchical depth information related to the size of the prediction unit (PU) block have a great value, the value of the quantization parameter (QP) is assigned small.

A smaller quantization parameter value is assigned to a coding unit (CU) block having relatively small hierarchical depth value as compared with a coding unit (CU) block having relatively greater depth value. For example, the quantization parameter value of the second region (2) is greater than that of the third region (3). The quantization parameter value of the third region (3) is greater than that of the fourth region (4). A CU having a smaller quantization parameter (QP) value is compressed with relatively more detail. Thus, in FIG. 2, the fourth region (4) can be compressed in more detail as compared with the third region (3) and the second region (2). Thus, the two objects (OB1, OB2) in a single frame/image can be encoded with better quality than the background.

Even in the case that in any two CU blocks, the first hierarchical depth information is the same, if the second hierarchical depth information related to the size of the prediction unit (PU) block is different from each other, a quantization parameter value being assigned becomes different.

A quantization parameter value being assigned becomes adaptively different depending on the first hierarchical depth information and the second hierarchical depth information and even if the first hierarchical depth information is the same, and it becomes different depending on the second hierarchical depth information.

An encoding based on an ROI is performed by a variable block encoder like the HEVC. The variable block encoder can perform an encoding operation without an extraction of an object in a frame and can perform an encoding operation without performing a judgment on a background region and an object region. Thus, it is not necessary to track an object region in a frame sequence.

In case of the encoder of FIG. 1, since ROI information can be obtained in its encoder processing loop, additional information is not required.

A video frame/image is compressed on the basis of a specific block size to perform an ROI encoding. An optimal size of coding unit may be determined by properly comparing the rate-distortion cost.

The rate-distortion cost can be calculated by a mathematical formula 1 below using a Lagrangian cost function. The rate-distortion cost is the amount of bits being consumed when the residual transform coefficient is encoded and the distortion represents the degree of distortion of an original macro block and a restored macro block using sum of square difference (SSD). B(k,l) represents the (k,l)th pixel value of the original macro block and B'(k,l) represents a (k,l)th pixel value of the restored macro block. λ is a constant determined by a quantization parameter.

$$RDCost = \text{Distortion} + \lambda_{mode} \times \text{Rates} \quad \text{[mathematical formula 1]}$$

$$\text{Distortion} = \sum_{k=1}^{16} \sum_{l=1}^{16} |B(k, l) - B'(k, l)|$$

$$\lambda_{mode} = 0.85 \times 2^{\frac{QP-12}{3}}$$

In an encoding based on ROI in a conventional technology, when making a decision about a coding unit quantization parameter, a conventional video encoder does not consider the video content in the frame. Thus, a quantization parameter of the coding unit (CU) block is determined by considering only the rate-distortion cost. Thus, the conventional video encoder has to provide an object extraction and/or an object tracking requiring the computational complexity of an additional calculation with respect to a coding based ROI.

FIG. 5 is a flow chart illustrating a hierarchical depth decision algorithm of a coding unit (CU) block being applied during performance of the method of FIG. 4.

A hierarchical depth decision algorithm of a coding unit (CU) block in a HEVC has steps S30 through S44.

In each coding unit, an encoder calculates a rate distortion cost of a coding unit having a hierarchical depth 0(C0).

The coding unit having the depth 0 (i.e., hierarchical depth 0) is divided into four sub blocks and a coding unit having a depth 1 (i.e., hierarchical depth 1) is made. The encoder also calculates the rate-distortion cost of the coding unit having a depth 1 (C1). For convenience of description, a coding unit having a hierarchical depth 0 is expressed by C0 and a coding unit having a hierarchical depth 1 is expressed by C1.

if the C0 is smaller than the C1, the encoder sets the depth of a current coding unit to 0. If the C0 is greater than the C1, the encoder divides each sub block into blocks having a smaller size. The encoder performs the algorithm described above again with an increased depth (e.g., 1→2).

To determine the depth of a coding unit (CU) block, after calculating the rate-distortion cost of a coding unit (CU) block having a depth N (N is a natural number including 0) and calculating the rate-distortion cost of a coding unit having a depth N+1 such that the coding unit (CU) block having a depth N is divided into sub blocks, an operation of comparing the calculated values with each other is performed. The work can be performed by a rate-distortion comparison part in the encoder.

In the case that the calculated value of the coding unit (CU) block having a depth N is smaller than the calculated value of the coding unit (CU) block having a depth N+1, a quantization parameter update part in the encoder sets the depth of a current coding unit (CU) block to N.

In the case that the calculated value of the coding unit (CU) block having a depth N is greater than the calculated value of the coding unit (CU) block having a depth N+1, the coding unit (CU) block having the depth N+1 is divided into sub blocks having a smaller size to make a coding unit (CU) block having a depth N+1. The rate-distortion comparison part in the encoder calculates the rate-distortion cost of the coding unit (CU) block having a depth N+2.

In a step S30, the block size of a coding unit is given as the block size of the largest coding unit (LOU) and the hierarchical depth of a coding unit (CU) block is given as 0. For convenience of description, a coding unit having a hierarchical depth 0 is expressed by C0 and a coding unit having a hierarchical depth 1 is expressed by C1.

In a step 32, the rate-distortion cost of the coding unit (CU) block C0 is calculated and in a step S34, the depth decision of a prediction unit (PU) block on the C0 is performed through the algorithm such as illustrated in FIG. 5.

In step S36, the rate-distortion cost of a coding unit (CU) block C1 such that the coding unit (CU) block C0 is divided into four sub blocks is calculated and in step S38, the depth decision of a prediction unit (PU) block on the C1 is performed through an algorithm such as illustrated in FIG. 5.

In a step S40, the calculated value of the rate-distortion cost of the coding unit (CU) block C0 having a depth 0 is compared with the calculated value of the rate-distortion cost of the coding unit (CU) block C1 having a depth 1. In the case that the calculated value of the rate-distortion cost of the coding unit (CU) block C0 is smaller than the calculated value of the rate-distortion cost of the coding unit (CU) block C1, the depth of a current coding unit (CU) block is set to a depth 0 in a step S42. The depth of a current prediction unit (PU) block is set to the depth of a prediction unit (PU) block decided on C0 in the step S34.

In the case that the calculated value of the rate-distortion cost of the coding unit (CU) block C0 is greater than the calculated value of the rate-distortion cost of the coding unit (CU) block C1, depth values of the CU and the PU are not set and the depth of the coding unit (CU) block increases by 1 in step S44. If the step S44 is completed, the steps S32 and S36 begin again. In this case, since the depth of the coding unit (CU) block increases by 1, rate-distortion costs of the coding unit (CU) block C1 and a divided coding unit (CU) block C2 are calculated to be compared with each other.

The depth value (information) of a coding unit (CU) block is determined and updated through the algorithm described above.

Figure 6:
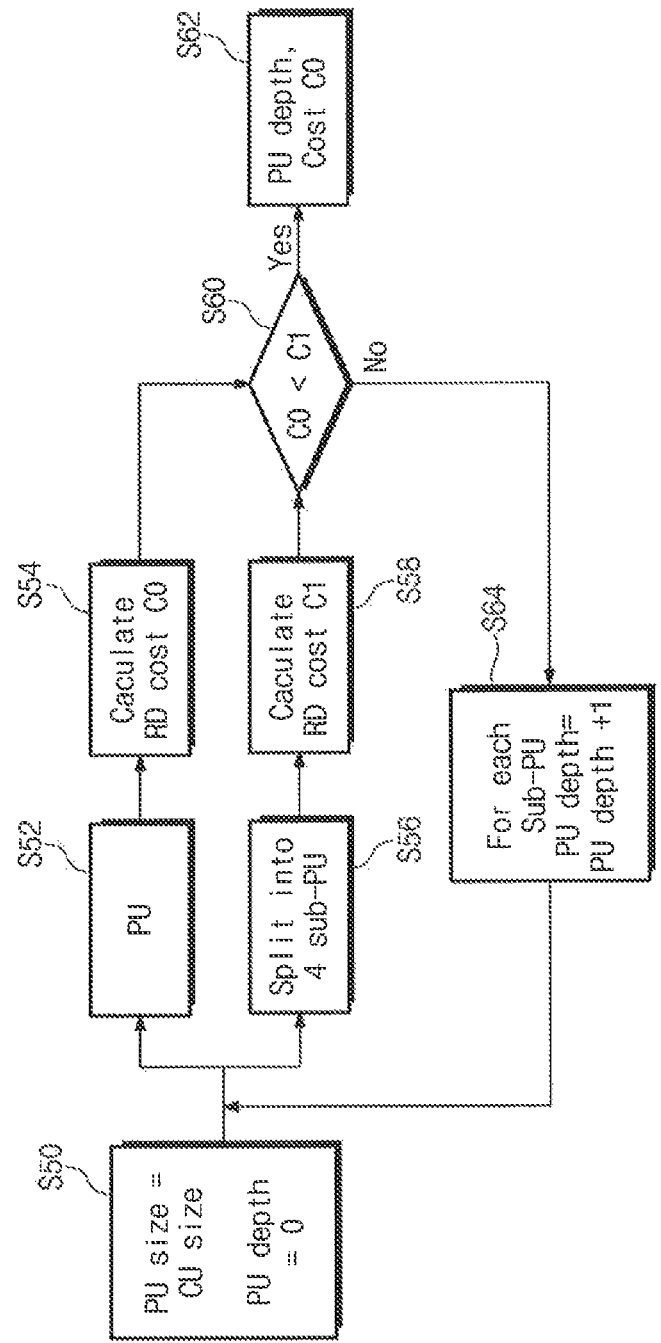
FIG. 6 is a flow chart illustrating a hierarchical depth decision algorithm of a prediction unit (PU) block being applied during performance of the method of FIG. 4.

FIG. 6 is a flow chart illustrating the hierarchical depth decision algorithm of a prediction unit (PU) block being applied during performance of the method of FIG. 4.

The depth decision algorithm of a prediction unit (PU) block in a HEVC has steps S50 through S64.

The depth decision algorithm of the prediction unit (PU) block is similar to the depth decision algorithm of the coding unit (CU) block of FIG. 5.

The depth decision of the prediction unit (PU) block, begins by calculating the rate-distortion cost of a prediction unit (PU) block having a depth N (N is a natural number including 0) and calculating the rate-distortion cost of a prediction unit (PU) block having a depth N+1 such that the prediction unit (PU) block having a depth N is divided into sub blocks.

In the case that the calculated value of the rate-distortion cost of the prediction unit (PU) block having the depth N is smaller than the calculated value of the rate-distortion cost of the prediction unit (PU) block having the depth N+1, a depth of a current prediction unit (PU) block is set to the depth N. In the case that the calculated value of the rate-distortion cost of the prediction unit (PU) block having the depth N is greater than the calculated value of the rate-distortion cost of the prediction unit (PU) block having the depth N+1, the prediction unit (PU) block having the depth N+1, is divided into sub blocks having a smaller size and then the rate-distortion cost may be calculated again.

The algorithm of FIG. 6 shows the steps S34 and S38 of FIG. 5 in detail.

In a step S50, a block size of a prediction unit (PU) is given a size which is the same as the block size of the coding unit (CU) and the depth of the prediction unit (PD) block is given 0.

In a step S52, a prediction unit (PU) block (PU0) constituting C0 is set and in a step S54, the rate-distortion cost RD of the prediction unit (PU) block (PU0) is calculated.

In a step S56, the prediction unit (PU) block (PU1) divided into four sub blocks is set as a block constituting C1. And in step S58, the rate-distortion cost RD of the prediction unit (PU) block (PU1) is calculated.

In a step S60, the calculated value of the rate-distortion cost of C0 having the PU0 is compared with the calculated value of the rate-distortion cost of C1 having the PU1. If the calculated value of the rate-distortion cost of C0 is smaller than the calculated value of the rate-distortion cost of C1, then the depth of a current prediction unit (PU) block is set to 0 in a step S62. The depth of the PU is set to the PU0.

If the calculated value of the rate-distortion cost of C0 is smaller than the calculated value of the rate-distortion cost of C1, then the depth value of the PU is not set and the depth of a prediction unit (PU) block increases by 1 in a step S64. If the step S64 is completed, the steps S52 and S56 begin again. In this case, since the depth of the prediction unit (PU) block increases by 1, rate-distortion costs of the prediction unit (PU) block PU1 and a divided prediction unit (PU) block PU2 are calculated to be compared with each other.

The depth value (information) of a prediction unit (PU) block is determined and updated through an algorithm such as illustrated in FIG. 6.

As described above, for a quantization parameter obtaining algorithm, update of a quantization parameter of a coding unit (CU) block is performed using a determined coding unit depth (depth_cu) and a determined prediction unit depth (depth_pu). $QP_{final}$ which is the update of CU QP block can be expressed as follows $$QP_{final} = QP_{initial} - (integer)(alpha \times depth\_cu + beta \times depth\_pu).$$

Thus, in the exemplary embodiment of the inventive concept, without additional calculation complexity, a video encoder based on an ROI is provided through the algorithm of FIG. 5. The encoder of the inventive concept can compress an object region (ROI) and a background region in a frame/image with different quality by adaptively setting a quantization parameter value on the basis of first depth information related to the size of a CU block and second depth information related to the size of a PU block.

However, the example described is an illustration and the inventive concept is not limited thereto.

Figure 7:
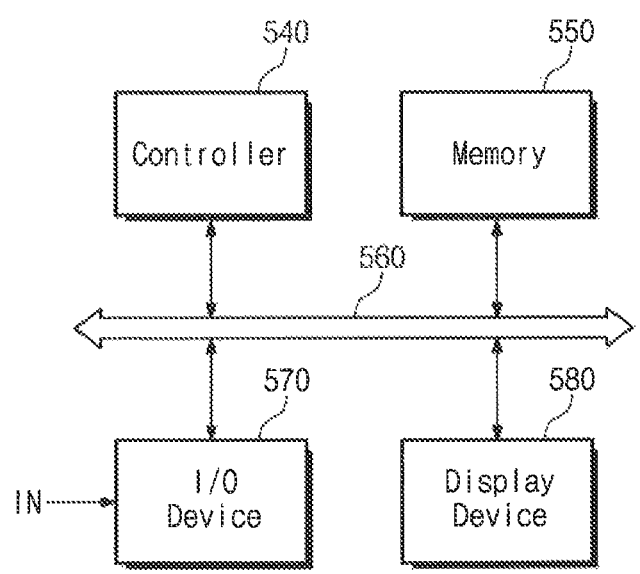
FIG. 7 is a block diagram illustrating an exemplary implementation of the inventive concept applied to implement an image processing system.

FIG. 7 is a block diagram illustrating an exemplary implementation of the inventive concept applied to implement an image processing system.

An image processing system may be a consumer electronic device such as a TV, a set top box, a desktop computer, a laptop computer, a palmtop computer, a personal digital assistant (PDA), a video or an image storage device (e.g., a video cassette recorder (VCR), a digital video recorder (DVR), etc.). The image processing system may be various combinations of those devices described above or a device in which any one or more of those devices described above are included. The image processing system includes an input/output device 570 receiving at least one of video/audio sources, a controller 540, a memory 550 and a display device 580.

The video/audio source may be provided by a TV receiver, a VCR or a different video/image storage device or a live feed. The video/audio source may also be one or more networks for receiving a video/image from a server using an internet, a wide area network (WAN), a local area network (LAN), a terrestrial broadcast system, a cable network, a satellite communication network, a wireless network, a telephone network, etc. The video/audio source may be combinations of the networks, or a different network in which a described network is included.

The input/output device 570, the controller 540 and the memory 550 communicate with one another through an interface/bus 560 which is a communication media. The interface 560 may be a telecommunication bus, a telecommunication network, or one or more internal connection circuits.

Input video/image data as the video/audio source can be processed by the controller 540 according to one or more software programs stored in the memory 550.

The software program stored in the memory 550 may be used to perform an encoding method such as illustrated in FIGS. 4, 5 and 6 in accordance with the inventive concept.

Figure 8:
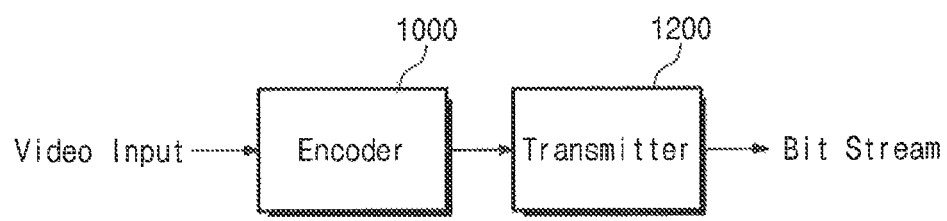
FIG. 8 is a block diagram illustrating an exemplary implementation of the inventive concept applied to implement a video transmission system.

FIG. 8 is a block diagram illustrating an exemplary implementation of the inventive concept applied to implement a video transmission system.

Referring to FIG. 8, a video transmission system includes an encoder 1000 and a transmitter 1200.

Since the encoder 1000 may be an encoder performing an encoding method such as in the exemplary embodiments of FIGS. 4, 5, and 6, and may be the encoder 1000 of FIG. 1 the calculation burden for the encoding method can be more simplified. Thus, the size of the video transmission system may be compacted.

The transmitter 1200 performs the function of bit-streaming data encoded by the encoder 1000 to transmit it to a transmission channel.

Figure 9:
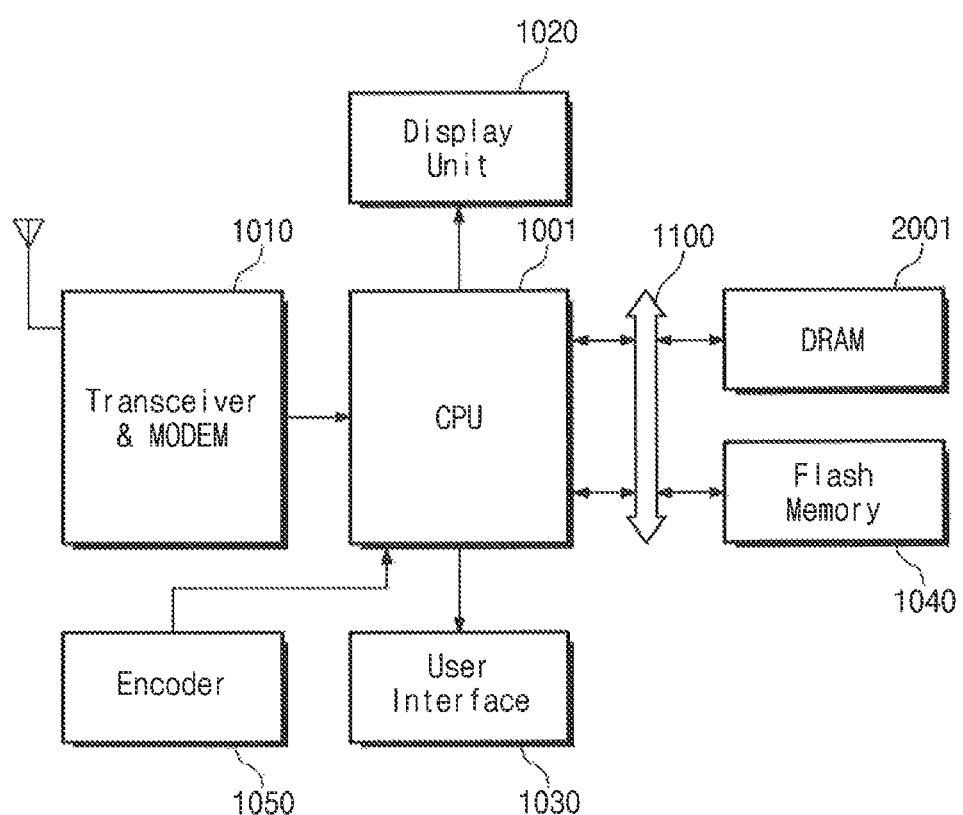
FIG. 9 is a block diagram illustrating an exemplary implementation of the inventive concept applied to implement a mobile electronic communication device.

FIG. 9 is a block diagram illustrating an exemplary implementation of the inventive concept applied to implement an electronic device.

Referring to FIG. 9, an electronic device includes a transceiver & modem 1010, a CPU 1001, a DRAM 2001, a flash memory 1040, a display unit 1020, a user interface 1030 and an encoder 1050.

The CPU 1001, the DRAM 2001 and the flash memory 1040 may be manufactured or packaged in one chip. The DRAM 2001 may be a synchronous or asynchronous random access memory.

The transceiver & modem 1010 performs a modulation and demodulation function of data transmission.

The CPU 1001 controls the overall operation of the electronic device according to a program previously set.

The DRAM 2001 may function as a main memory of the CPU 1001.

The flash memory 1040 may be a NOR type flash memory or a NAND type flash memory.

The display unit 1020 may have a touch screen as a device such as a liquid crystal having a backlight, a liquid crystal having a LED light source or an OLED. The display unit 1020 functions as an output device displaying an image such as characters, (e.g., letters and numbers), a pictures (e.g., video), etc. with color.

The user interface 1030 may be an input device including a numeric key, a function key, etc. and performs an interface between the electronic device and a person.

Since the encoder 1050 may be the encoder 1000 in FIG. 1 and can perform the method and update algorithms such as illustrated in FIGS. 4, 5 and 6, performance of the electronic device may become more powerful.

The electronic device may function as a mobile device, or a smart device or a SSD by adding or subtracting constituent elements if necessary.

The electronic device can be connected to an external communication device through a separate interface. The communication device may be a digital versatile disc (DVD) player, a computer, a set top box, a game machine, a digital camcorder, etc.

Although not illustrated in the drawing, the electronic device may further include an application chipset, a camera image processor (CIS), a mobile DRA, etc.

A chip forming the electronic device may be mounted using various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSCP), thin small outline (TSOP), thin quad flatpack (TQFP), system in package (SIP), multi chip package (MCP), wafer-level fabricated package (WFP) and wafer-level processed stack package (WSP).

In FIG. 9, a flash memory 1040 is adopted as an illustration but any nonvolatile storage may be used.

The nonvolatile storage can store data information having various types of data such as a text, a graphic, a software code, etc.

The nonvolatile storage may be embodied by an electrically erasable programmable read-only memory (EE-PROM), a flash memory, a magnetic random access memory (MRAM), a spin-transfer torque MRAM, a conductive bridging RAM (CBRAM), a ferroelectric RAM (FeRAM), a phase change RAM (PRAM) which is called an ovonic unified memory (OUM), a resistive RAM (RRAM), a nanotube RRAM, a polymer RAM (PoRAM), a nanotube floating gate memory (NFGM), a holographic memory, a molecular electronics memory device, or an insulator resistance change memory.

Figure 10:
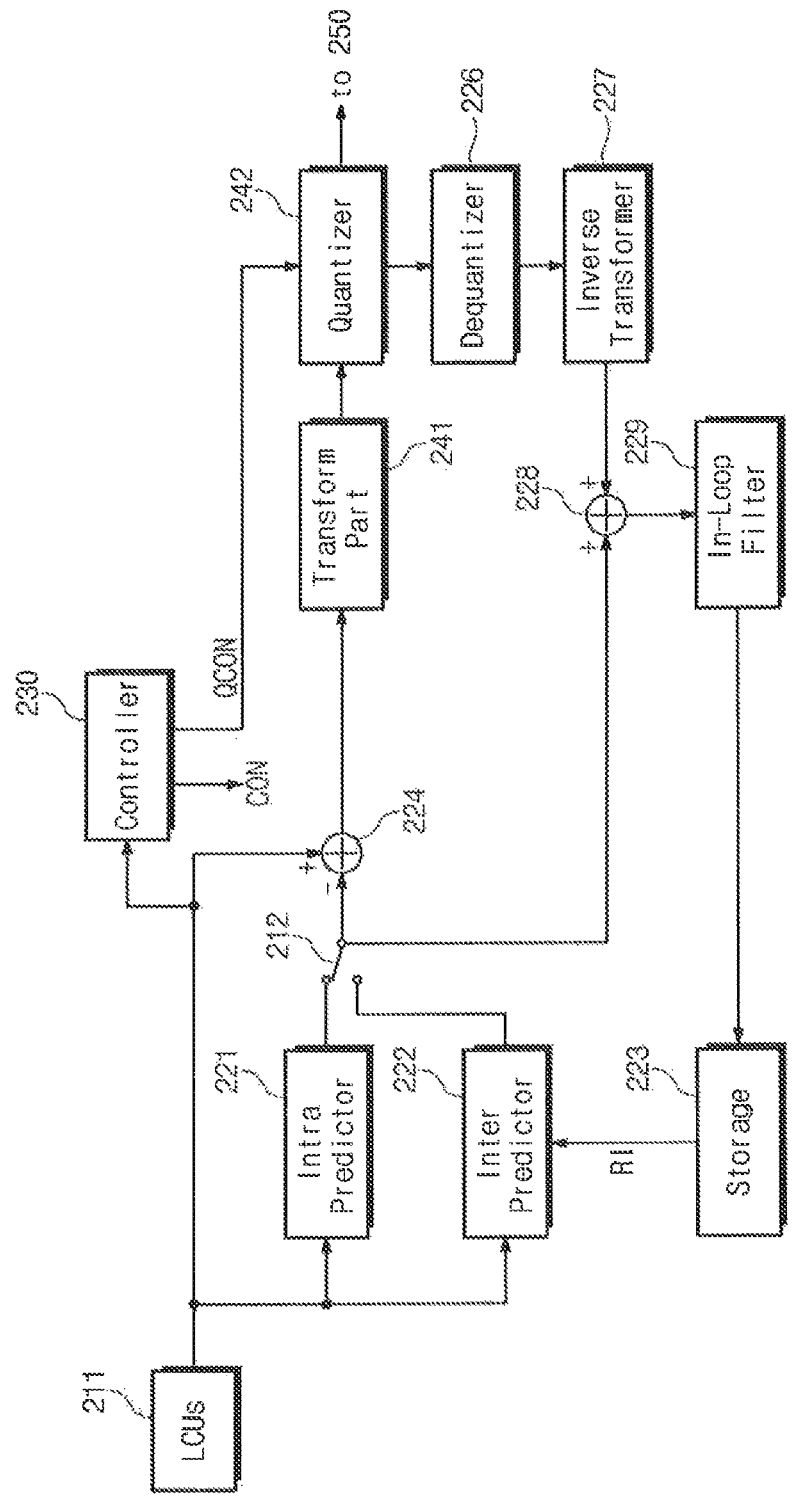
FIG. 10 is a block diagram of an encoder performing the encoding method of FIG. 4.

FIG. 10 is a block diagram of an encoder performing the encoding method of FIG. 4.

Referring to FIG. 10, an encoder which is suited for a HEVC may include an intra predictor 221, an inter predictor 222, first and second combiners 224 and 228, a controller 230, a transform part 241, a quantizer 242, a dequantizer 226, an in-loop filter and a storage 223.

LCUs (the maximum coding units of a frame) 211 obtained from an input video sequence are provided to the first combiner 224, to the intra predictor 221 and to the inter predictor 222. The inter predictor 222 may include a motion estimator and a motion compensator.

A mode determining switch 212 is controlled by a control signal CON of the controller 230. One of a motion compensated inter predictor PUs of the inter predictor 222 and an intra predictor PUs of the intra predictor 221 is switched according to the coding cost of PUs and a picture prediction mode.

An output of the mode determining switch 212, a predicted PU is provided to a negative input of the first combiner 224 and a positive input of the second combiner 228.

The first combiner 224 subtracts a predicted PU from a current PU to provide a residual PU to the transform part 241. A residual PU obtained from the first combiner 224 is a set of pixel difference values measuring the difference between pixel values of an original PU and a predicted PU.

The transform part 241 performs a block transform on residual PUs to transform residual pixel values into transform coefficients. The transform part 241 provides transform coefficients to the quantizer 242. The transform part 241 receives transform block sizes of the residual PUs and applies transform of prescribed sizes to the residual PUs to generate transform coefficients.

The quantizer 242 quantizes transform coefficients being applied from the transform part 241 on the basis of a quantization parameter. The controller 230 makes a quantization parameter adaptively change by coding unit (CU) block by applying a quantization parameter control signal QCON to the quantizer 242. The controller 230 determines the quantization parameter using the first depth information related to the size of a CU block and the second depth information related to the size of a PU block. If the first and second depth information has a great value, then a small value of the quantization parameter QP is assigned. And if the first and second depth information has a small value, then a great value of the quantization parameter QP is assigned. If a small value of the quantization parameter QP is assigned, then a CU can be compressed with a relatively detailed description.

Transform coefficients quantized by the quantizer 242 may be scanned by a scanning part, and then may be rearranged in the order of importance of coefficients.

Ordered and quantized transform coefficients provided through a scanning part according to header information about a PU may be provided to an entropy encoder providing a compressed bit stream to a video buffer to perform a transmission operation and a storage operation. The entropy encoder encodes the transform coefficients.

The storage 223 stores the output of the in-loop filter 229 to provide a reference image RI to the inter predictor 222. The in-loop filter 229 receives a PU of the second combiner 228 which is unfiltered and reconstituted to filter the PU. The second combiner 228 adds a selected PU and the reconstituted PU.

The encoder of FIG. 10 is only an example and the inventive concept is not limited thereto.

Figure 11:
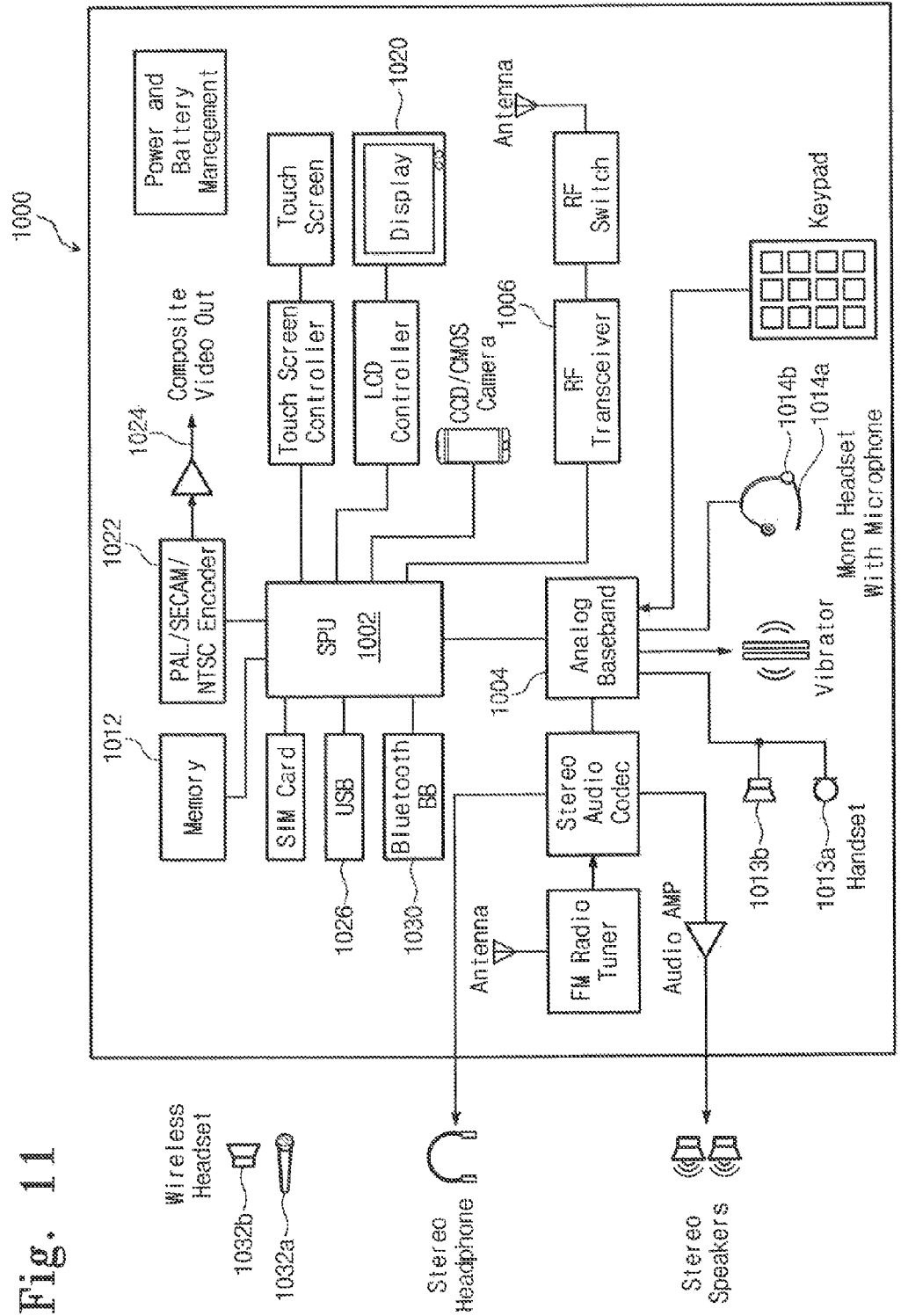
FIG. 11 is a block diagram of a digital system to which the encoder of FIG. 10 is applied.

FIG. 11 is a block diagram of a digital system to which the encoder of FIG. 10 is applied or included.

Referring to FIG. 11, a signal processing unit (SPU) 1002 includes a DSP. An analog base band unit 1004 receives a voice data stream from a handset microphone 1013*a* and transmits the voice data stream to a handset mono speaker 1013*b*. The analog base band unit 1004 receives a voice data stream from microphones 1014*a* and 1032*a* and transmits the voice data stream to a mono headset 1014*b* or a wireless headset 1032*b*.

A display 1020 can display a picture or a video/frame sequence being received from a local camera 1028, a USB 1026 or a memory 1012 or from and external source.

The signal processing unit (SPU) 1002 can transmit a video sequence being received through a Bluetooth interface 1030 or an RF transceiver 1006 to the display 1020.

The signal processing unit (SPU) 1002 can transmit a video sequence to an external video display unit through an encoder unit 1022. The encoder unit 1022 can perform video encoding according to any of the PAL/SCAM/NTSC video standards.

The signal processing unit (SPU) 1002 can include functions for performing calculation operations required for a video encoding/decoding operation.

Since the signal processing unit (SPU) 1002 performs the function of the controller 230 of FIG. 10, and the method of FIG. 4, it can determine the quantization parameter using the first depth information related to the size of a CU block and the second depth information related to the size of a PU block.

Thus, a video/image can be compressed with different image quality depending on information in a frame without additional calculation complexity. A region of interest (ROI) including an object can be compressed with a more detailed description as compared with a region including a background.

Figure 12:
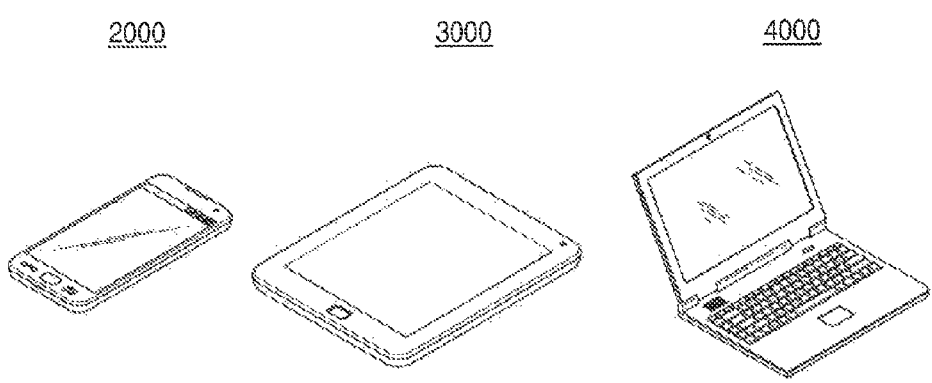
FIG. 12 is a drawing illustrating three examples of the inventive concept applied to implement portable electronic communication devices.

FIG. 12 is a drawing illustrating an exemplary implementation of the inventive concept applied to implement a portable electronic communication device.

In FIG. 12, a cellular phone 2000 includes the encoder 1000 of FIG. 1 and thereby additional calculation complexity may be avoided to perform an encoding in a video encoder base on an ROI. Thus, performance of an encoding in the cellular phone 2000 is enhanced.

The cellular phone 2000 may be embodied by a data processing device that can use or support a MIPI interface and may further include an application processor, an image sensor, and a display in addition to the encoder 1000.

The cellular phone 2000 can perform a communication using an ultra wideband (UWB), a wireless local area network (WLAN) and a worldwide interoperability for microwave access (WIMAX). The illustrated forms and structures and interfaces of the cellular phone 2000 is only examples and the inventive concept is not limited thereto.

A tablet PC 3000 does not need to provide an object extraction and/or an object tracking requiring additional calculation complexity on an ROI by including the encoder 1000 of FIG. 1. Thus, performance of an encoding operation of the tablet PC may be improved.

In FIG. 12, a notebook computer 4000 does not need to provide an object extraction and/or an object tracking requiring additional calculation complexity based on an ROI by including the encoder 1000 of FIG. 1. Thus, performance of an encoding operation of the notebook computer may be improved.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A region of interest (ROI) coding method using variable block size coding information comprising:
   partitioning a maximum coding unit (LCU) block obtained from an image frame into coding unit (CU) blocks; and
   for each coding unit (CU) block, obtaining the quantization parameter of the coding unit (CU) block by assigning a value of its quantization parameter based on first hierarchical depth information and second hierarchical depth information by determining its quantization parameter using the first hierarchical depth information related to the size of the coding unit (CU) block and the second hierarchical depth information related to the size of a prediction unit (PU) block corresponding to the partition of the coding unit (CU) block, wherein if the first information related to the size of the coding unit (CU) block and the second hierarchical depth information related to the size of the prediction unit (PU) block are great, then the quantization parameter is determined small.

2. The region of interest coding method of claim 1, wherein when determining the quantization parameter, the rate-distortion cost is additionally considered.

3. The region of interest coding method of claim 1, wherein the size of the coding unit (CU) block and the size of the prediction unit (PU) block are utilized as texture information.

4. The region of interest coding method of claim 1, wherein update of the quantization parameter is performed using the size of the coding unit (CU) block and the first hierarchical depth information of the coding unit (CU) block.

5. The region of interest coding method of claim 1, wherein update of the quantization parameter is performed using the size of the prediction unit (PU) block and the second hierarchical depth information of the prediction unit (PU) block.

6. The region of interest coding method of claim 1, wherein update of the quantization parameter is performed using the first hierarchical depth information of the coding unit (CU) block and the second hierarchical depth information of the prediction unit (PU) block.

7. The region of interest coding method of claim 1, wherein the region of interest coding is performed without an extraction of an object region in the frame.

8. The region of interest coding method of claim 1, wherein the region of interest coding is performed without distinction of a background region and an object region in the frame.

9. The region of interest coding method of claim 1, wherein the region of interest coding is performed without tracking an object region included in the frame within a frame sequence.

10. The region of interest coding method of claim 1, wherein the region of interest coding is performed by a variable block encoder.

11. The region of interest coding method of claim 6, wherein determination of the first hierarchical depth information of the coding unit (CU) block comprises:
   calculating the rate-distortion cost of the current coding unit (CU) block having a hierarchical depth N (N is a natural number including 0);
   calculating the rate-distortion cost of the current coding unit (CU) block having a hierarchical depth N+1 divided into sub blocks;
   if the calculated value of the current coding unit (CU) block having the hierarchical depth N is smaller than the calculated value of the current coding unit (CU) block having the hierarchical depth N+1, then setting the hierarchical depth of the current coding unit (CU) block to the hierarchical depth N; and
   if the calculated value of the current coding unit (CU) block having the hierarchical depth N is greater than the calculated value of the current coding unit (CU) block having the hierarchical depth N+1, then determining the rate-distortion cost after the current coding unit (CU) block having the hierarchical depth N+1 is divided into sub blocks having a smaller size.

12. The region of interest coding method of claim 6, wherein determination of the second hierarchical depth information of the prediction unit (PU) block comprises of the current coding unit (CU) block:

calculating the rate-distortion cost of the current prediction unit (PU) block having a hierarchical depth N (N is a natural number including 0);

calculating the rate-distortion cost of the current prediction unit (PU) block having a hierarchical depth N+1 divided into sub blocks;

if the calculated value of the current prediction unit (PU) block having the hierarchical depth N is smaller than the calculated value of the current prediction unit (PU) block having the hierarchical depth N+1, then setting the hierarchical depth of the current prediction unit (PU) block to the hierarchical depth N; and if that the calculated value of the current prediction unit (PU) block having the hierarchical depth N is greater than the calculated value of the prediction unit (PU) block having the hierarchical depth N+1, determining the rate-distortion cost after the current prediction unit (PU) block having the hierarchical depth N+1 is divided into sub blocks having a smaller size.

13. An encoder for performing a high efficiency video coding (HEVC) comprising:

a rate-distortion comparison circuit for calculating and comparing the rate-distortion cost of a coding unit (CU) block partitioned from a maximum coding unit (LCU) block obtained from an image frame; and a quantization parameter updating controller for assigning a value of a quantization parameter to each coding unit (CU) block based on its first hierarchical depth information and its second hierarchical depth information by determining the quantization parameter using the first hierarchical depth information related to the size of the coding unit (CU) block and the second hierarchical depth information related to the size of a prediction unit (PU) block corresponding to the partition of the coding unit (CU) block, wherein if the first hierarchical depth information related to the size of the coding unit (CU) block and the second hierarchical depth information related to the size of the prediction unit (PU) block are small, then the quantization parameter is determined great.

14. An encoder for performing a high efficiency video coding (HEVC) comprising:

a plurality of M sub-encoders;

a partitioner circuit configured to partition a maximum coding unit (LCU) block obtained from an image frame into a plurality of M coding unit (CU) blocks;

a rate-distortion comparison circuit for calculating and comparing the rate-distortion cost of each coding unit (CU) divided into sub blocks at a hierarchical depth N+1 and the rate-distortion cost of the coding unit (CU) divided into sub blocks at a hierarchical depth N; and a quantization parameter circuit configured, for each coding unit (CU) block, to obtain the quantization parameter of the coding unit (CU) block by assigning a value of its quantization parameter based on first hierarchical depth information and second hierarchical depth information by determining its quantization parameter using the first hierarchical depth information related to the size of the coding unit (CU) block and the second hierarchical depth information related to the size of a prediction unit (PU) block corresponding to the partition of the coding unit (CU) block, wherein if the first hierarchical depth information related to the size of the coding unit (CU) block and the second hierarchical depth information related to the size of the prediction unit (PU) block are small, then the quantization parameter is determined great.

\* \* \* \* \*